(12) United States Patent
Ueda et al.

(10) Patent No.: US 7,474,067 B2
(45) Date of Patent: Jan. 6, 2009

(54) ELECTRIC POWER STEERING SYSTEM

(75) Inventors: Takeshi Ueda, Yamatokooriyama (JP); Katsutoshi Nishizaki, Nabari (JP)

(73) Assignee: Jtekt Corporation, Osaka (JP)

( * ) Notice: Subject to any disclaimer, the term of this patent is extended or adjusted under 35 U.S.C. 154(b) by 490 days.

(21) Appl. No.: 10/574,809

(22) PCT Filed: Oct. 5, 2004

(86) PCT No.: PCT/JP2004/014644

§ 371 (c)(1), (2), (4) Date: Apr. 5, 2006

(87) PCT Pub. No.: WO2005/035333

PCT Pub. Date: Apr. 21, 2005

(65) Prior Publication Data

US 2007/0052381 A1    Mar. 8, 2007

(30) Foreign Application Priority Data

Oct. 7, 2003 (JP) ............................. 2003-348566

(51) Int. Cl.
    *H02P 7/00* (2006.01)
(52) U.S. Cl. ................. 318/432; 318/434; 318/400.23
(58) Field of Classification Search ................. 318/432, 318/434, 400.23
    See application file for complete search history.

(56) References Cited

U.S. PATENT DOCUMENTS

| 6,407,524 | B1 * | 6/2002 | Endo et al. ............... 318/432 |
| 6,927,548 | B2 * | 8/2005 | Nishizaki et al. ......... 318/432 |
| 2002/0097015 | A1 | 7/2002 | Kitajima et al. | |
| 2003/0109974 | A1 | 6/2003 | Ishihara | |
| 2008/0167779 | A1 * | 7/2008 | Suzuki ..................... 701/42 |

FOREIGN PATENT DOCUMENTS

| JP | 62-64293 | 3/1987 |
| JP | 64-60264 | 3/1989 |
| JP | 4-54872 | 2/1992 |
| JP | 04-79788 | 3/1992 |
| JP | 2001-018822 | 1/2001 |
| JP | 2001-186790 | 7/2001 |
| JP | 2002-223600 | 8/2002 |
| JP | 2002-247899 | 8/2002 |
| JP | 2003-61272 | 2/2003 |
| JP | 2003-137110 | 5/2003 |
| JP | 2003-199390 | 7/2003 |
| JP | 2004-64909 | 2/2004 |
| JP | 2004-215399 | 7/2004 |
| JP | 2004-328814 | 11/2004 |
| WO | WO 00/14864 | 3/2000 |

* cited by examiner

Primary Examiner—Rina I Duda
Assistant Examiner—Erick Glass
(74) Attorney, Agent, or Firm—Westerman, Hattori, Daniels & Adrian, LLP.

(57) ABSTRACT

There are provided a high-order current distortion compensator which uses rotational position information on an electric motor and a target current value of the electric motor for deciding a compensation value for current high-order-component for canceling torque ripple caused by predetermined high-order components of a current flowing through the motor, and a correction portion which corrects the target current value by using the compensation value supplied from the high-order current distortion compensator. A feedback controller provides feedback control of the electric motor based on the target current value corrected by the correction portion. Thus is suppressed the torque ripple caused by the predetermined high-order components, whereby the degradation of steering feeling is reduced.

5 Claims, 11 Drawing Sheets

ELECTRIC POWER STEERING SYSTEM

TECHNICAL FIELD

The present invention relates to an electric power steering system mounted in vehicles such as automotive vehicles and employing an electric motor for assisting a driver in steering operation.

BACKGROUND ART

The electric power steering system, mounted in an automotive vehicle for example, includes an electric motor connected to a steering mechanism extending from an steering member to dirigible wheels, and is adapted to apply a motor power to the steering mechanism thereby assisting the driver in the steering operation by way of the steering member.

The electric motor may encounter a problem that an output torque thereof suffers ripple (pulsation). The ripple is classified broadly into cogging toque (mechanical ripple) resulting from motor constitution including the number of rotor poles, the number of slots for stator coils and the like; and electrical ripple occurring as a result of induced electromotive force having waveform distorted relative to an idealistic waveform. Such torque ripples contained in the motor output constitute one causative factor of degrading a steering feeling characteristic of the steering system. This leads to a strong demand for suppressing the torque ripples in the steering system.

As disclosed in Japanese Unexamined Patent Publication No. 2003-61272, for example, some conventional systems are adapted to reduce the torque ripple by changing the configuration of the slot at its portion opposite a rotor magnet or adjusting a skew angle.

By the way, the electric power steering system employs, for example, a three-phase brushless motor as the above electric motor.

However, the aforesaid motor may sometimes provide an output torque containing the torque ripple (electrical ripple) caused by high-order components of current produced by the rotation of a distorted magnetic field, thus degrading the steering feeling.

In view of the aforementioned problem encountered by the conventional technique, it is an object of the invention to provide an electric power steering system capable of suppressing the torque ripple caused by the high-order components of current, thereby preventing the degradation of steering feeling.

DISCLOSURE OF THE INVENTION

According to the invention for achieving the above object, an electric power steering system operative to decide a target current value of an electric motor according to an operation of a steering member and to provide steering assist by applying a power of the motor to a steering mechanism, the system comprises:

torque-ripple compensation decision means which uses rotational position information on the electric motor and the decided target current value thereby deciding a compensation value for current high-order-component for canceling torque ripple caused by predetermined high-order components of the current flowing through the motor; correction means for correcting the decided target current value by using the compensation value supplied from the torque-ripple compensation decision means; and feedback control means for providing feedback control of the electric motor based on the target current value corrected by the correction means.

In the electric power steering system of the above constitution, the torque-ripple compensation decision means uses the rotational position information on the electric motor and the target current value decided according to the operation of the steering member, so as to estimate torque ripple caused by the predetermined high-order components of the current of the target current value which is supplied to the motor. Then, the decision means decides the compensation value for current high-order-component for canceling the estimated torque ripple. On the other hand, the feedback control means provides the feedback control of the electric motor based on the target current value which is corrected by the correction means based on the compensation value supplied from the torque-ripple compensation decision means. Therefore, when the control means permits the supply of the current of the corrected target current value, the current removed of the predetermined high-order components is supplied to the motor so that the torque ripple associated with the high-order components may be suppressed.

It is further preferred in the above electric power steering system that the torque-ripple compensation decision means varies the compensation value for current high-order-component according to the decided target current value.

In this case, the above compensation value is varied according to motor load. Even when the motor load is varied, the feedback control means may control the electric motor by using the target current value corrected with a more suitable compensation value. Hence, the degradation of steering feeling is more positively prevented.

In the above electric power steering system, the torque-ripple compensation decision means may be provided not only with a high-order current distortion compensator for deciding the compensation value for current high-order-component, but also with a magnetic-field distortion compensator which uses the rotational position information on the electric motor and the decided target current value, thereby deciding a field-distortion compensation value for suppressing torque ripple caused by a distorted magnetic field formed in the motor.

In this case, the target current value is corrected by using not only the compensation value for current high-order-component decided by the high-order current distortion compensator but also the field-distortion compensation value decided by the magnetic-field distortion compensator. When the feedback control means permits the supply of the current of the target current value, not only the torque ripple caused by the high-order components but also the torque ripple caused by the distorted magnetic field formed in the motor may be suppressed. Thus, the steering feeling may be prevented from being degraded by these ripples.

It is further preferred that the above electric power steering system further comprises: a current control system including the electric motor and the feedback control means; rotational-speed detection means for detecting a rotational speed of the electric motor based on the rotational position information; and gain compensation calculation means for determining a gain compensation value for compensating for gain decrease dependant upon a frequency characteristic of the current control system, the compensation value determined based on the rotational speed of the electric motor supplied from the rotational-speed detection means, and is characterized in that the correction means corrects the decided target current value by using the compensation value supplied from the torque-ripple compensation decision means and the gain compensation value supplied from the gain compensation calculation means.

In this case, the feedback control means provides the feedback control of the electric motor based on the target current value corrected with the compensation value supplied from the torque-ripple compensation decision means and the gain compensation value supplied from the gain compensation calculation means. Hence, the control means is adapted to compensate for the decrease of the gain of the current through the motor according to the frequency characteristic of the current control system. The current gain is decreased more as the motor is increased in the rotational speed. Thus, the control means may prevent the steering feeling from being degraded in conjunction with the gain decrease.

Furthermore, the above electric power steering system may further comprise phase compensation calculation means for determining a phase compensation value for compensating for phase delay dependant upon the frequency characteristic of the current control system, the phase compensation value determined based on the rotational speed of the electric motor supplied from the rotational-speed detection means, and is characterized in that the correction means corrects the decided target current value by using the compensation value supplied from the torque-ripple compensation decision means, the gain compensation value supplied from the gain compensation calculation means and the phase compensation value supplied from the phase compensation calculation means.

In this case, the feedback control means provides the feedback control of the electric motor based on the target current value corrected with the compensation value supplied from the torque-ripple compensation decision means, the gain compensation value supplied from the gain compensation calculation means and the phase compensation value supplied from the phase compensation calculation means. Hence, the control means is adapted to compensate for the phase delay of the current through the motor according to the frequency characteristic of the current control system. The current phase is more delayed relative to induced voltage as the motor is increased in the rotational speed. As a result, the steering feeling may be prevented from being degraded due to the phase delay.

BEST MODES FOR CARRYING OUT THE INVENTION

An electric power steering system according to a preferred embodiment of the invention will hereinbelow be described with reference to the accompanying drawings. The following description is made by way of example where the invention is applied to a column-assist electric power steering system wherein a brushless motor as the electric motor is connected to a steering shaft connected with a steering member.

[General Constitution of Electric Power Steering System]

Figure 1:
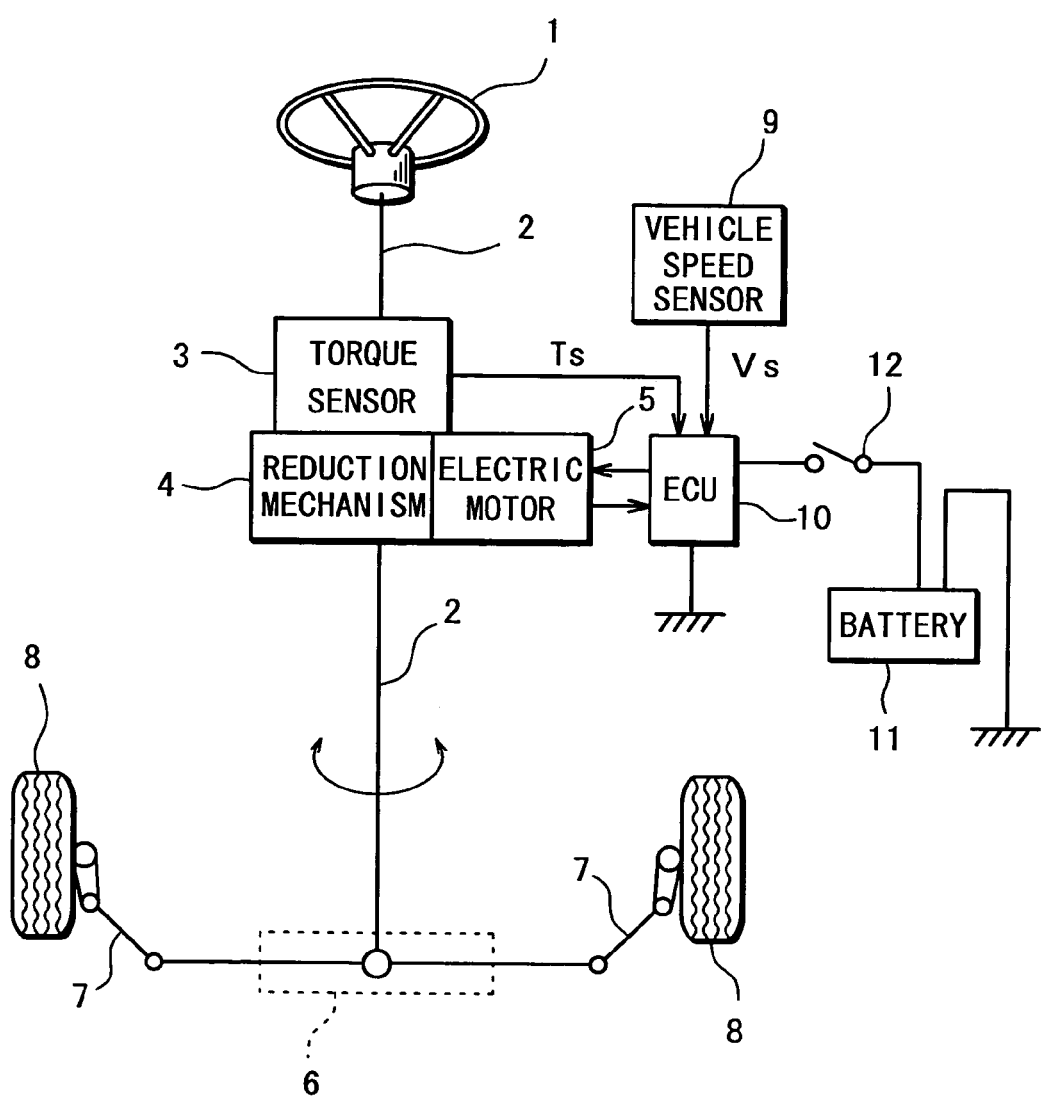
FIG. 1 is a schematic diagram showing an arrangement of an essential part of an electric power steering system according to one embodiment of the invention.

FIG. 1 is a schematic diagram showing an arrangement of an essential part of the electric power steering system according to one embodiment of the invention. Referring to the figure, the system is mounted in, for example, an automotive vehicle and includes a steering shaft 2 operating to change the direction of dirigible wheels 8 according to a steering operation of a driver applying a steering force to a steering member (steering wheel) 1. Specifically, the steering shaft 2 has one end connected with the steering member 1 and has the other end connected to the right and left dirigible wheels 8 by means of a rack-and-pinion transmission mechanism 6, tie rods 7 and the like. The rotation of the steering shaft 2 is converted into lateral linear motion by means of the rack-and-pinion transmission mechanism 6, whereby the dirigible wheels 8 are steered.

The steering shaft 2 is provided with an electric motor 5 disposed at intermediate portion thereof and connected thereto via a torque sensor 3 and a reduction mechanism 4. These reduction mechanism 4 and electric motor 5 constitute a steering assist portion for applying a steering assist force based on a motor power to a steering mechanism extending from the steering member 1 to the dirigible wheels 8. Specifically, the torque sensor 3 detects a torque produced in the steering shaft 2 according to the steering operation of the steering member 1 by the driver, road surface resistance inversely inputted from the dirigible wheels 8, and the like. Then, the sensor outputs a torque detection signal Ts to an ECU 10 as a control unit, the signal indicating a value of the detected torque. Furthermore, the ECU 10 is supplied with electric power from a battery 11 in response to On/Off operation of an ignition switch 12 and also receives a vehicle speed signal Vs from a vehicle speed sensor 9 for detecting a speed of the automotive vehicle and a signal corresponding to rotor rotation of the electric motor 5. Based on these input signals, the ECU 10 drivably controls the electric motor 5 thereby providing the steering assist based on a required steering assist force.

[Constitution of Electric Motor and Overview of Drivable Control Thereof]

Figure 2:
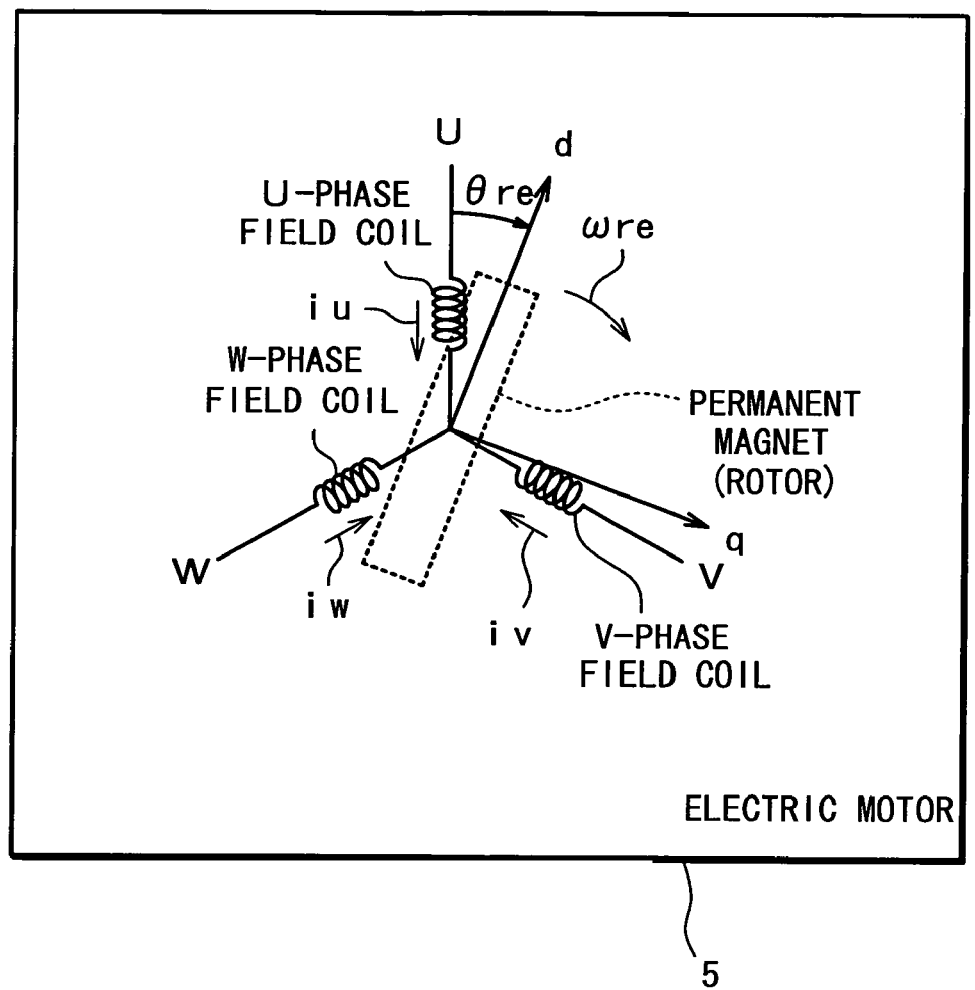
FIG. 2 is a diagram showing relation between three-phase-AC coordinates and d-q coordinates of the electric motor shown in FIG. 1.

Referring to FIG. 2, the aforesaid electric motor 5 includes: a rotor possessing, for example, a permanent magnet; and U-phase field coil, V-phase field coil and W-phase field coil (stator coils). That is, the electric motor is constituted by a three-phase star-connection brushless motor of sinusoidal drive system.

In this motor 5, individual target values of phase currents to be supplied to the respective phase field coils for producing a required steering assist force, namely, individual current command values i*u, i*v and i*w for the respective phase field coils are represented by the following expressions (1) to (3):

$$i*u = I* \times \sin\theta re \quad (1)$$

$$i*v = I* \times \sin(\theta re - 2\pi/3) \quad (2)$$

$$i*w = I* \times \sin(\theta re - 4\pi/3) = -i*u - i*v \quad (3)$$

where I* represents a maximum value (amplitude) of the supply current.

It is noted that θre represents a rotational angle (electrical angle) of the permanent magnet (rotor) in positive rotation in clockwise direction with respect to, for example, the U-phase filed coil, as shown in the figure. This electrical angle constitutes information indicating a rotational position of the rotor and is expressed as θre=(p/2)×θm, where θm represents a mechanical angle indicating an actual rotational angle of the rotor, and p represents the number of poles of the rotor. Hereinafter, the term "angle" means the electrical angle unless otherwise stated.

The electric motor 5 is subjected to feedback control provided by a feedback controller (described hereinlater) included in the above ECU 10. This feedback control uses d-q coordinates. The d-q coordinates define the d-axis to express a direction of magnetic flux from the permanent magnet, and the q-axis to express a direction perpendicular to the d-axis. The d-q coordinates constitute a rotating frame which rotates in synchronism with the rotation of the above magnet (revolving magnetic field). When deciding a command value of voltage applied to the electric motor 5, the ECU 10 first converts the respective current command values i*u, i*v, i*w of the phase field coils, as represented by the above expressions (1) to (3), to a d-axis current command value i*d and a q-axis current command value i*q which are represented by the following expressions (4) and (5), respectively. Then, the ECU decides the above command value of application voltage based on the converted current command values i*d and i*q on the d-q coordinates. By converting the respective current command values i*u, i*v, i*w on three-phase-AC coordinates (rest frame) to the current command values i*d and i*q on the d-q coordinates in this manner, the ECU 10 is capable of controlling the supply current on an AC-current quantity basis even when the motor 5 is in rotation. Thus, the ECU 10 may provide a high-accuracy drivable control of the motor 5 as reducing phase delay and such, thereby easily producing a required steering assist force:

$$i*d = 0 \quad (4),$$

$$i*q = -\sqrt{(3/2)} \times I* \quad (5).$$

The respective quantities of current actually flowing through the U-phase, V-phase and W-phase field coils of the electric motor 5 are determined as follows. A current sensor (described hereinlater) detects, for example, a U-phase current value iu and a V-phase current value iv. These detected values iu and iv are substituted in the following expressions (6) and (7) for obtaining d-axis current detection value id and q-axis current detection value iq, which represent values converted in terms of the d-q coordinates. As will be specifically described, the ECU 10 provides the feedback control based on the above d-axis current command value i*d and q-axis current command value i*q, and the d-axis current detection value id and q-axis current detection value iq.

$$Id = \sqrt{2}\{iv \times \sin\theta re - iu \times \sin(\theta re - 2\pi/3)\} \quad (6)$$

$$iq = \sqrt{2}\{iv \times \cos\theta re - iu \times \cos(\theta re - 2\pi/3)\} \quad (7)$$

[Constitution and Operations of ECU]

Figure 3:
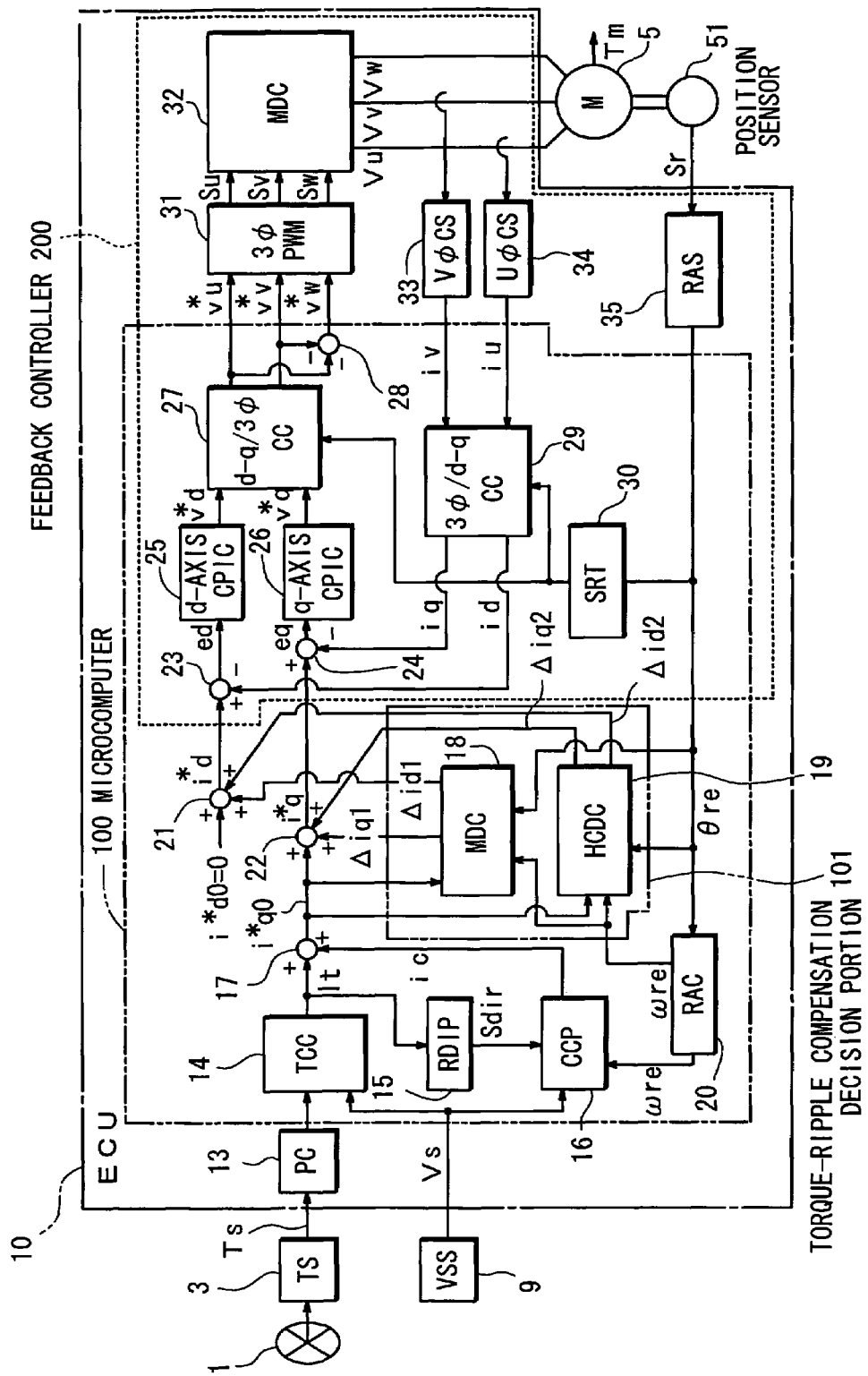
FIG. 3 is a block diagram showing an exemplary constitution of an ECU shown in FIG. 1.

FIG. 3 is a block diagram showing an exemplary constitution of the ECU shown in FIG. 1. As shown in the figure, the ECU 10 includes: a phase compensator 13 to which the torque signal Ts from the torque sensor 3 is inputted; a microcomputer 100; and a motor driver constituted by hardware which follows a command from the microcomputer 100 to control the above electric motor 5 by way of PWM signal. The motor driver is provided with: a three-phase PWM modulator 31 connected to the microcomputer 100; and a motor driver circuit 32 connected between the three-phase PWM modulator 31 and the individual stator coils (U-, V-, W-phase field coils) of the electric motor 5 as a drive subject.

The above motor driver further includes: a V-phase current sensor 33 and a U-phase current sensor 34, for example, which individually detect currents supplied to the V-phase field coil and U-phase field coil; and a rotor angular-position sensor 35 for detecting the aforesaid electrical angle based on a sensor output (signal Sr corresponding to rotor rotation) from a position sensor 51 which is disposed on an electric motor 5 side and constituted by a resolver or the like. As indicated by a block enclosed in dot lines, the motor driver and a part of the microcomputer 100 jointly constitute the aforesaid feedback controller 200 for providing the feedback control of the electric motor 5. On the other hand, the position sensor 51 and the rotor angular-position sensor 35 jointly constitute rotational-position information acquisition means for acquiring information on rotational position (electrical angle) of the electric motor 5.

The microcomputer 100 is provided with a plurality of function blocks. The microcomputer executes programs previously stored in a non-volatile memory (not shown) incorporated therein, thereby causing the individual function blocks to perform predetermined calculation processes required for the motor control. Specifically, the microcomputer 100 includes, as shown in FIG. 3, a target current-value calculator 14, a rotational direction indication portion 15, a convergence correction portion 16, an adder 17, a magnetic-field distortion compensator 18, a high-order current distortion compensator 19, a rotor angular-speed calculator 20, adders 21, 22, subtracters 23, 24, a d-axis current PI controller 25, a q-axis current PI controller 26, a d-q/three-phase-AC coordinates converter 27, a sign inversion adder 28, a three-phase-AC/d-q coordinates converter 29 and a sinusoidal ROM table 30. Thus, the microcomputer 100 constitutes a motor controller which decides a required steering assist force based on the input signals such as the vehicle speed signal Vs from the vehicle speed sensor 9, and applies an output signal (command) corresponding to the decided steering assist force to the motor driver.

The motor controller is provided with a torque-ripple compensation decision portion 101 which possesses the above magnetic-field distortion compensator 18 and high-order current distortion compensator 19. A calculation result given by the compensation decision portion 101 is reflected in a command signal inputted to the motor driver, whereby a torque ripple caused by a distorted magnetic field formed in the electric motor 5 and a torque ripple caused by high-order components of current through the motor 5 are reduced, as will be specifically described hereinlater. Furthermore, the rotor angular-speed calculator 20 constitutes rotational-speed detection means for detecting a rotational speed of the electric motor 5 based on the rotational position information supplied from the aforesaid rotational-position information acquisition means.

When the aforesaid torque detection signal Ts from the torque sensor 3 is inputted to the ECU 10 constituted as described above, the phase compensator 13 compensates for the phase of the input torque detection signal Ts and outputs the resultant signal to the target current-value calculator 14. The ECU 10 is also supplied with the vehicle speed signal Vs, which is outputted from the vehicle speed sensor 9 in predetermined sampling cycles. The input vehicle speed signal Vs is applied to the target current-value calculator 14 and the convergence correction portion 16 of the microcomputer 100. When the sensor signal Sr from the position sensor 51 is inputted to the rotor angular-position sensor 35 in the ECU 10, the rotor angular-position sensor 35 detects a rotational position of the permanent magnet (rotor) of the electric motor 5, or the aforesaid electrical angle $\theta$re, based on the input sensor signal Sr. Then, the rotor angular-position sensor 35 outputs an angle signal indicative of the detected electrical angle $\theta$re to the magnetic-field distortion compensator 18, the high-order current distortion compensator 19, the rotor angular-speed calculator 20 and the sinusoidal ROM table 30 of the microcomputer 100.

The target current-value calculator 14 decides a target current value It based on the phase compensated torque detection signal Ts and the vehicle speed signal Vs, the target current value indicating a value of current to be supplied to the electric motor 5. More specifically, the calculator 14 previously stores a table called an assist map, which represents relation among the torque as determined at the steering shaft 2, the aforesaid target current value It for producing the required steering assist force according to the torque, and the vehicle speed. The calculator 14 refers the individual values of the torque detection signal Ts and the vehicle speed signal Vs, as input parameters, to the above table, thereby acquiring the target current value It, which is outputted to the rotational direction indication portion 15 and the adder 17.

The target current value It is equivalent to the q-axis current command value i*q represented by the expression (5) and has a sign indicating a direction of the assist force based on the motor power. That is, the sign of the target current value It specifies the rotational direction of the motor rotor. For instance, a positive sign or a negative sign directs the electric motor 5 to be so rotated as to assist a rightward steering or a leftward steering of the steering member 1.

The rotational direction indication portion 15 determines the rotational direction of the rotor based on the sign of the target current value It inputted from the target current-value calculator 14 and then, generates a direction signal Sdir indicating the rotational direction of the rotor. The resultant signal is outputted to the convergence correction portion 16. The convergence correction portion 16 is supplied with the aforesaid vehicle speed signal Vs, the direction signal Sdir and a rotor angular speed $\omega$re which is calculated by the rotor angular-speed calculator 20 based on the electrical angle $\theta$ere inputted from the rotor angular-position sensor 35. The correction portion 16 performs a predetermined calculation using these input signals, thereby determining a compensation current value ic for providing a convergence characteristic of the vehicle. The adder 17 adds the compensation current value ic to the target current value It and outputs the resultant sum as a q-axis fundamental-current command value i*q0.

The above q-axis fundamental-current command value i*q0 represents a fundamental command value (target current value) of the supply current corresponding to a motor load (torque to be produced by the electric motor 5) to produce the required steering assist force. This command value is applied to the magnetic-field distortion compensator 18 and high-order current distortion compensator 19 of the torque-ripple compensation decision portion 101 at a time. Furthermore, this command value is also outputted to the adder 22 which adds this command value so as to reflect the calculation results obtained by the magnetic-field distortion compensator 18 and high-order current distortion compensator 19.

On the other hand, a d-axis directed current is not involved in the torque and hence, a d-axis fundamental-current command value i*d0 representing a fundamental command value of d-axis current takes a value "0". Thus, the command value is set as i*d0=0 and inputted in the adder 21.

The magnetic-field distortion compensator 18 uses the electrical angle $\theta$re as the information indicating the rotational position of the electric motor 5 and supplied from the rotor angular-position sensor 35, and the q-axis fundamental-current command value i*q0 supplied from the adder 17 thereby deciding a field-distortion compensation value for suppressing the torque ripple caused by the distorted magnetic field formed in the motor 5. Specifically, when a current of a value specified by the q-axis fundamental-current command value i*q0 is supplied to the individual phase field coils of the electric motor 5, the magnetic-field distortion compensator 18 estimates the torque ripple appearing in the motor output torque due to distorted waveforms of induced electromotive forces in the individual phase field coils (the distorted magnetic field in the motor 5) relative to the idealistic waveform. Then, the distortion compensator calculates a current compensation value for each of the d-axis current and the q-axis current, such as to change the q-axis fundamental-current command value i*q0 to reduce the estimated torque ripple. Thus, the distortion compensator decides d-axis current compensation value $\Delta$id1 and q-axis current compensation value $\Delta$iq1 (the details of which will be described hereinlater). The magnetic-field distortion compensator 18 outputs the resultant d-axis current compensation value $\Delta$id1 and q-axis current compensation value $\Delta$iq1 for field distortion compensation to the corresponding adders 21 and 22.

The d-axis current compensation value $\Delta$id1 and q-axis current compensation value $\Delta$iq1 outputted from the magnetic-field distortion compensator 18 are so corrected as to minimize gain decrease and phase delay which depend upon a frequency characteristic of a current control system including the electric motor 5, as will be described hereinlater.

The high-order current distortion compensator 19 uses the aforesaid electrical angle $\theta$re and q-axis fundamental-current command value i*q0 thereby deciding a compensation value for current high-order-component for canceling the torque ripple caused by the high-order components of the current flowing through the motor 5. Specifically, when the current of the value specified by the q-axis fundamental-current command value i*q0 is supplied to the individual phase field coils of the electric motor 5, the high-order current distortion compensator 19 estimates the torque ripple caused by certain high-order components of the current flowing through the individual phase field coils. Then, the distortion compensator calculates a current compensation value for each of the d-axis current and the q-axis current, such as to change the q-axis fundamental-current command value i*q0 to cancel the estimated torque ripple. Thus, the distortion compensator decides d-axis current compensation value $\Delta$id2 and q-axis current compensation value $\Delta$iq2 (the details of which will be described hereinlater). The high-order current distortion compensator 19 outputs the resultant d-axis current compensation value Δid2 and q-axis current compensation value Δiq2 for high-order component of current to the corresponding adders 21 and 22.

The d-axis current compensation value Δid2 and q-axis current compensation value Δiq2 outputted from the high-order current distortion compensator 19 are so corrected as to minimize the gain decrease and phase delay which depend upon the frequency characteristic of the current control system including the electric motor 5, as will be described hereinlater.

The above adders 21 and 22 each constitute correction means which corrects the target current value based on each corresponding d-axis current or q-axis current compensation value supplied from the torque-ripple compensation decision portion 101, the target current value decided according to the operation of the steering member 1.

Specifically, the adder 21 determines a sum of the d-axis fundamental-current command value i*d0 set therein, the d-axis current compensation value Δid1 for field distortion compensation supplied from the magnetic-field distortion compensator 18 and the d-axis current compensation value Δid2 for high-order current compensation supplied from the high-order current distortion compensator 19 as represented by the following expression (8), thereby obtaining the d-axis current command value i*d reflecting the calculation result supplied from the torque-ripple compensation decision portion 101. Then, the adder 21 outputs the resultant d-axis current command value i*d to the subtracter 23 of the feedback controller 200.

On the other hand, the adder 22 determines a sum of the q-axis fundamental-current command value i*q0 supplied from the adder 17, the q-axis current compensation value Δiq1 for field distortion compensation supplied from the magnetic-field distortion compensator 18 and the q-axis current compensation value Δiq2 for high-order current compensation supplied from the high-order current distortion compensator 19 as represented by the following expression (9), thereby obtaining the q-axis current command value i*q reflecting the calculation result supplied from the torque-ripple compensation decision portion 101. Then, the adder 22 outputs the resultant q-axis current command value i*q to the subtracter 24 of the feedback controller 200.

$$i^*d = i^*d0 + \Delta id1 + \Delta id2 \tag{8}$$

$$i^*q = i^*q0 + \Delta iq1 + \Delta iq2 \tag{9}$$

In addition to the d-axis current command value i*d from the adder 21, the subtracter 23 also receives the d-axis current detection value id from the three-phase-AC/d-q coordinates converter 29, the detection value converted in terms of the d-axis current of the current actually supplied to the electric motor 5. Likewise, in addition to the q-axis current command value i*q from the adder 22, the subtracter 24 also receives the q-axis current detection value iq from the three-phase-AC/d-q coordinates converter 29, the detection value converted in terms of the q-axis current of the current actually supplied to the electric motor 5.

More specifically, the V-phase current value iv and U-phase current value iu detected by the respective V-phase current sensor 33 and U-phase current sensor 34 are inputted to the three-phase-AC/d-q coordinates converter 29. Furthermore, the converter 29 is also supplied with a sin-value of the electrical angle θre from the sinusoidal ROM table 30, the sin-value determined in conjunction with the above detected current. The sinusoidal ROM table 30 stores the angle θ and the sin-value of the angle θ as correlating these parameters with each other. At receipt of the electrical angle θre from the rotor angular-position sensor 35, the ROM table immediately outputs the sin-value to the d-q/three-phase-AC coordinates converter 27 and the three-phase-AC/d-q coordinates converter 29.

Using the U-phase current detection value iu, the V-phase current detection value iv and the sin-value so inputted and the aforementioned expressions (6) and (7), the three-phase-AC/d-q coordinates converter 29 calculates the aforesaid d-axis current detection value id (=√2{iv×sin θre−iu×sin (θre−2π/3)} and the q-axis current detection value iq (=√2{iv×cos θre−iu×cos (θre−2π/3)} and outputs the calculation results to the respectively corresponding subtracters 23, 24.

The subtracter 23 subtracts the inputted d-axis current detection value id from the d-axis current command value i*d, so as to determine a d-axis current deviation ed (=i*d−id) which is a difference between these input values. Likewise, the subtracter 24 subtracts the inputted q-axis current detection value iq from the q-axis current command value i*q, so as to determine a q-axis current deviation eq (=i*q−iq) which is a difference between these input values. These subtracters 23, 24 output the d-axis current deviation ed and q-axis current deviation eq to the d-axis current PI controller 25 and the q-axis current PI controller 26, respectively.

The d-axis current PI controller 25 and q-axis current PI controller 26 substitute the d-axis current deviation ed and q-axis current deviation eq, from the respectively corresponding subtracters 23, 24, in the following expressions (10) and (11), respectively, thereby calculating respective d-axis voltage command value v*d and q-axis voltage command value v*q. Then, the controllers output the calculation results to the d-q/three-phase-AC coordinates converter 27.

$$v^*d = K_P\{ed + (1/Ti)\int(ed)dt\} \tag{10}$$

$$v^*q = K_P\{eq + (1/Ti)\int(eq)dt\} \tag{11}$$

where $K_P$ and Ti represent proportional gain and integration time, respectively. These values are previously set in the d-axis current PI controller 25 and q-axis current PI controller 26 according to motor characteristics and the like.

Inputted to the d-q/three-phase-AC coordinates converter 27 are the d-axis voltage command value v*d from the d-axis current PI controller 25, the q-axis voltage command value v*q from the q-axis current PI controller 26 and the sin-value from the sinusoidal ROM table 30. This converter 27 uses the following expressions (12) and (13) for converting the above d-axis voltage command value v*d and q-axis voltage command value v*q, as application voltage command values on the d-q coordinates, to U-phase voltage command value v*u and V-phase voltage command value v*v, as application voltage command values on the three-phase-AC coordinates. Then, the converter outputs the converted values to the above three-phase PWM modulator 31. The output values from this converter 27 are also inputted to the sign inversion adder 28. The sign inversion adder 28 uses the following expression (14) for determining a W-phase voltage command value v*w from the above U-phase voltage command value v*u and V-phase voltage command value v*v. Then, the adder outputs the resultant value to the three-phase PWM modulator 31.

$$v^*u = \sqrt{(2/3)}\{v^*d \times \cos \theta re - v^*q \times \sin \theta re\} \tag{12}$$

$$v^*v = \sqrt{(2/3)}\{v^*d \times \cos(\theta re - 2\pi/3) - v^*q \times \sin(\theta re - 2\pi/3)\} \tag{13}$$

$$v^*w = -v^*u - v^*v \tag{14}$$

The three-phase PWM modulator 31 generates PWM signals Su, Sv and Sw which individually have duty ratios corresponding to the respective U-phase voltage command value v*u, V-phase voltage command value v*v and W-phase voltage command value v*w and outputs the resultant signals to the motor driver circuit 32.

The motor driver circuit 32 includes a PWM voltage inverter possessing a bridge circuit employing power switching devices such as MOSFETs. The circuit turns On/Off the individual switching devices according to the above PWM signals Su, Sv and Sw thereby applying the voltage from the battery 11 (FIG. 1) to the respective U-phase, V-phase and W-phase field coils (FIG. 2) of the electric motor 5. Thus, the current flows through the individual phase field coils of the electric motor 5 so that the motor 5 produces a torque Tm according to the current. The torque, as the steering assist force, is applied to the aforesaid steering mechanism. When the electric motor 5 is driven in this manner, the feedback controller 200 provides the feedback control of the motor 5 such as to equalize the above d-axis current detection value id and q-axis current detection value iq to the respective d-axis current command value i*d and q-axis current command value i*q. Thus, the steering assist based on the required steering assist force may be provided.

[Constitution and Frequency Characteristic of Current Control System]

Figure 6:
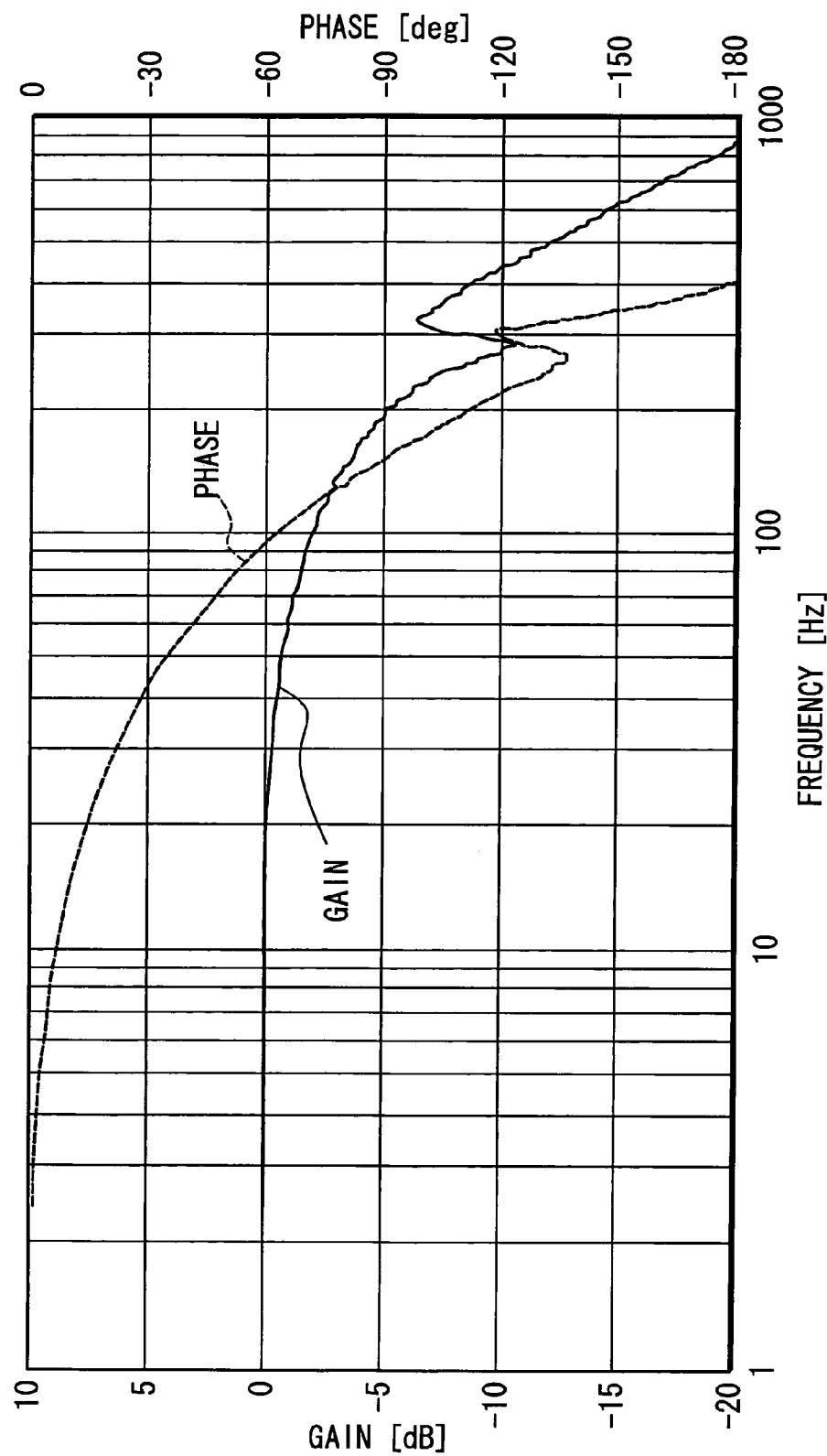
FIG. 6 is a Bode diagram showing a frequency characteristic of a current control system shown in FIG. 3.

According to the embodiment, as shown in FIG. 3, the above feedback controller 200, the electric motor 5 as the control subject and the position sensor 51 constitute the current control system possessing a feedback loop. This current control system has the frequency characteristic defined by impedances of the coils disposed in the motor 5. In the current control system wherein a d-axis current feedback loop which has an input of the d-axis current command value i*d and an output of the d-axis current detection value id and a q-axis current feedback loop which has an input of the q-axis current command value i*q and an output of the q-axis current detection value iq are both closed loops, a Bode diagram related to a transfer function of the system is represented by FIG. 6. In this current control system, as indicated by a solid line in FIG. 6, the gain is decreased from 1 (dB=0) as the frequency is increased in a practical frequency range. On the other hand, the phase delay is increased as the frequency is increased, as indicated by a dot line in the figure. The following approach is taken to reduce the influence of such a frequency characteristic of the current control system. The data indicated by the solid line and dot line in FIG. 6 are tabulated as a frequency characteristic map, which is stored in the magnetic-field distortion compensator 18 and the high-order current distortion compensator 19 disposed in the torque-ripple compensation decision portion 101. The compensation values outputted from the respective compensators are so corrected as to minimize the gain decrease and phase delay dependant upon the frequency characteristic of the system.

[Constitution and Operations of Magnetic-Field Distortion Compensator]

Figure 4:
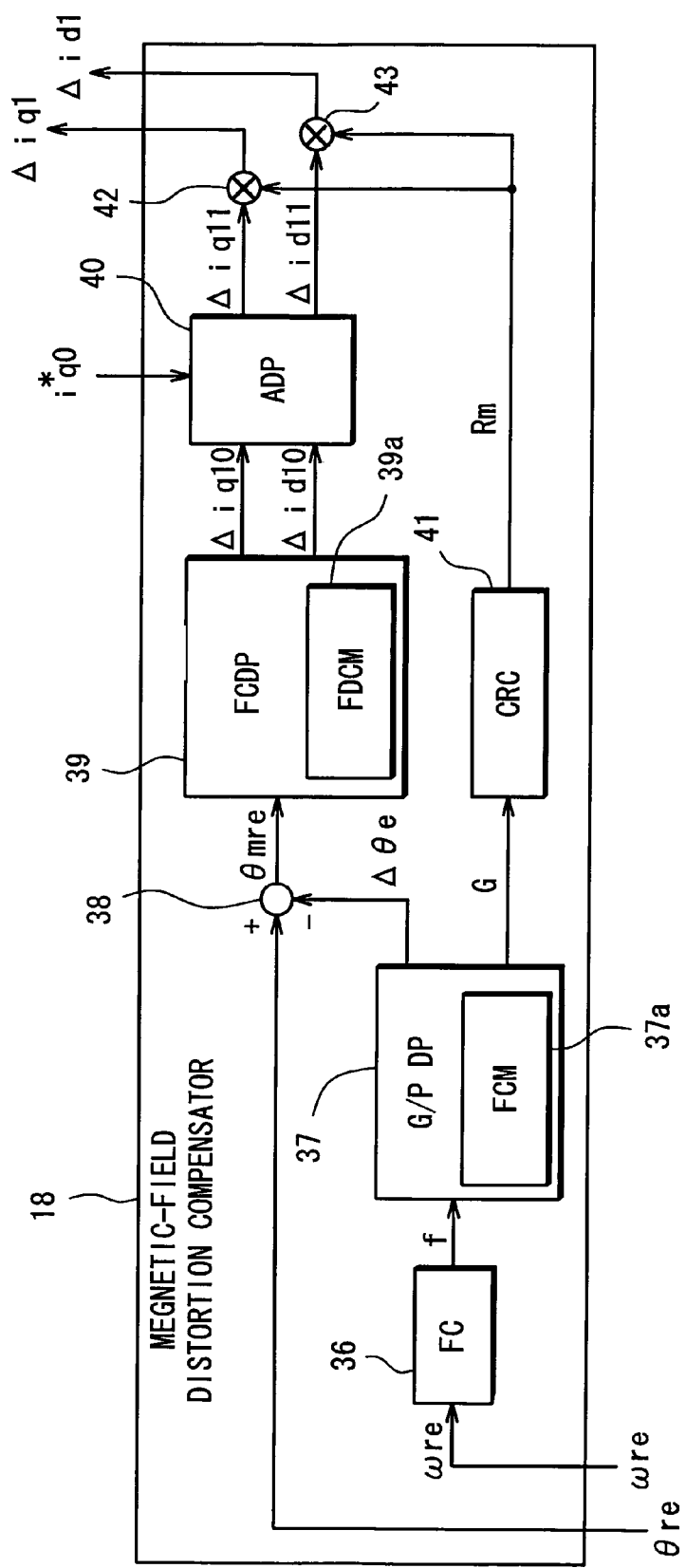
FIG. 4 is a block diagram showing a specific example of a constitution of a magnetic-field distortion compensator shown in FIG. 3.

FIG. 4 is a block diagram showing a specific example of a constitution of the magnetic-field distortion compensator shown in FIG. 3. As shown in the figure, the magnetic-field distortion compensator 18 is provided with function blocks which include a frequency calculator 36, a gain/phase decision portion 37, a subtracter 38, a field-distortion compensation-value decision portion 39, an amplitude decision portion 40, a correction rate calculator 41 and multipliers 42, 43. The microcomputer 100 executes the programs thereby causing the individual blocks to perform predetermined calculation processes. The above frequency calculator 36, gain/phase decision portion 37 and correction rate calculator 41 constitute gain compensation calculation means which uses the rotational speed of the electric motor 5 (FIG. 3) for determining a gain compensation value for compensating for the gain decrease dependant upon the frequency characteristic of the current control system. Furthermore, the frequency calculator 36 and the gain/phase decision portion 37 also serve as phase compensation calculation means which uses the rotational speed of the motor 5 for determining a phase compensation value for compensating for the phase delay dependant upon the frequency characteristic of the current control system.

Specifically, the frequency calculator 36 receives from the rotor angular-speed calculator 20 the rotor angular speed are which is the rotational angular speed of the electric motor 5 as converted in terms of the electrical angle. The frequency calculator 36 substitutes the input rotor angular speed ωre in the following expression (15), thereby calculating a frequency f of the torque ripple caused by the magnetic-field distortion appearing in the motor output. The frequency f is a fundamental frequency of the torque ripple caused by the distorted high-order current components.

$$f = S \times \omega re / (2\pi) \tag{15},$$

where S represents a degree of the torque ripple (the number of torque ripples occurring per cycle of the electrical angle).

The above gain/phase decision portion 37 stores a frequency characteristic map 37a corresponding to the frequency characteristic of the current control system shown in the Bode diagram (FIG. 6) (that is, the data indicating the relations of the frequency, gain and phase as indicated by the solid line and dot line in FIG. 6). When receiving the frequency f from the frequency calculator 36, the gain/phase decision portion 37 refers to the frequency characteristic map 37a to determine a gain G and phase difference Δθe of the current control system in correspondence to the input frequency f. The decision portion 37 outputs the respective values to the correction rate calculator 41 and the subtracter 38. In the current control system, as described above, with the increase of the frequency (namely, as the rotor angular speed ωre and the rotational speed of the electric motor 5 increases), the gain is decreased from 1 while the phase delay is increased.

The subtracter 38 receives the electrical angle θre from the rotor angular-position sensor 35 (FIG. 3) and the phase difference Δθe, as the phase compensation value, from the gain/phase decision portion 37, so as to subtract the phase difference Δθe from the electrical angle θre. The subtracter 38 outputs a corrected electrical angle θmre (=θre−Δθe), as the subtraction result, to the field-distortion compensation-value decision portion 39. In this manner, the subtracter 38 corrects the electrical angle θre with the phase difference Δθe, thereby compensating for the phase delay dependant upon the frequency characteristic of the current control system.

The field-distortion compensation-value decision portion 39 stores a field distortion compensation map 39a which tabulates relations of the above electrical angle and the respective values of field-distortion compensating components of the d-axis current and q-axis current. The compensation-value decision portion 39 refers to the field distortion compensation map 39a thereby determining d-axis current unit compensation value Δid10 and q-axis current unit compensation value Δiq10 for magnetic-field distortion, which correspond to the corrected electrical angle θmre.

A detailed description will be made, as below, on a method of preparing the field distortion compensation map 39a. Provided that sinusoidal currents iu, iv, iw are supplied to the respective phase field coils in a case where a distorted magnetic field is formed in the electric motor 5 under no-load operation or where the induced electromotive force under no-load has a distorted waveform relative to the idealistic waveform, the motor output sustains the torque ripple due to the distorted magnetic field. If instantaneous values e0u, e0v, e0w of the no-load induced electromotive force as determined at the respective coils are known, it is possible to decide such current values i0u, i0v, i0w of the respective coils as to provide a constant output torque from the motor 5 (say, 1 [Nm]) and to obviate the torque ripple due to the distorted magnetic field. Provided that the output torque is at a fixed value T, for example, the aforesaid currents of the individual coils i0u, i0v, i0w may be calculated based on the following expressions (16), (17) and (18), respectively:

$$i0u = \{(e0u-e0v)+(e0u-e0w)\} \times T/\{(e0u-e0v)^2 + (e0u-e0w)^2 + (e0w-e0v)^2\} \quad (16)$$

$$i0v = \{T-(e0u-e0w) \times iu\}/(e0v-e0w) \quad (17)$$

$$i0w = \{T-(e0u-e0v) \times iu\}/(e0w-e0v) \quad (18)$$

The currents i0u, i0v, i0w of the respective phase field coils, as calculated based on the above expressions (16) to (18), may be converted to respective values on the d-q coordinates by using the following expressions (19) and (20) using the electrical angle θ as a variable. Thus are obtained a d-axis current value i0d and a q-axis current value i0q which may provide a constant value T of the output torque without inducing the torque ripple due to the distorted magnetic field:

$$i0d = \sqrt{2}\{i0v \times \sin\theta - i0u \times \sin(\theta - 2\pi/3)\} \quad (19)$$

$$i0q = \sqrt{2}\{i0v \times \cos\theta - i0u \times \cos(\theta - 2\pi/3)\} \quad (20)$$

Since it is possible to calculate the d-axis current value i0d and the q-axis current value i0q, as described above, the field distortion compensation map 39a may be prepared as follows.

Figure 7:
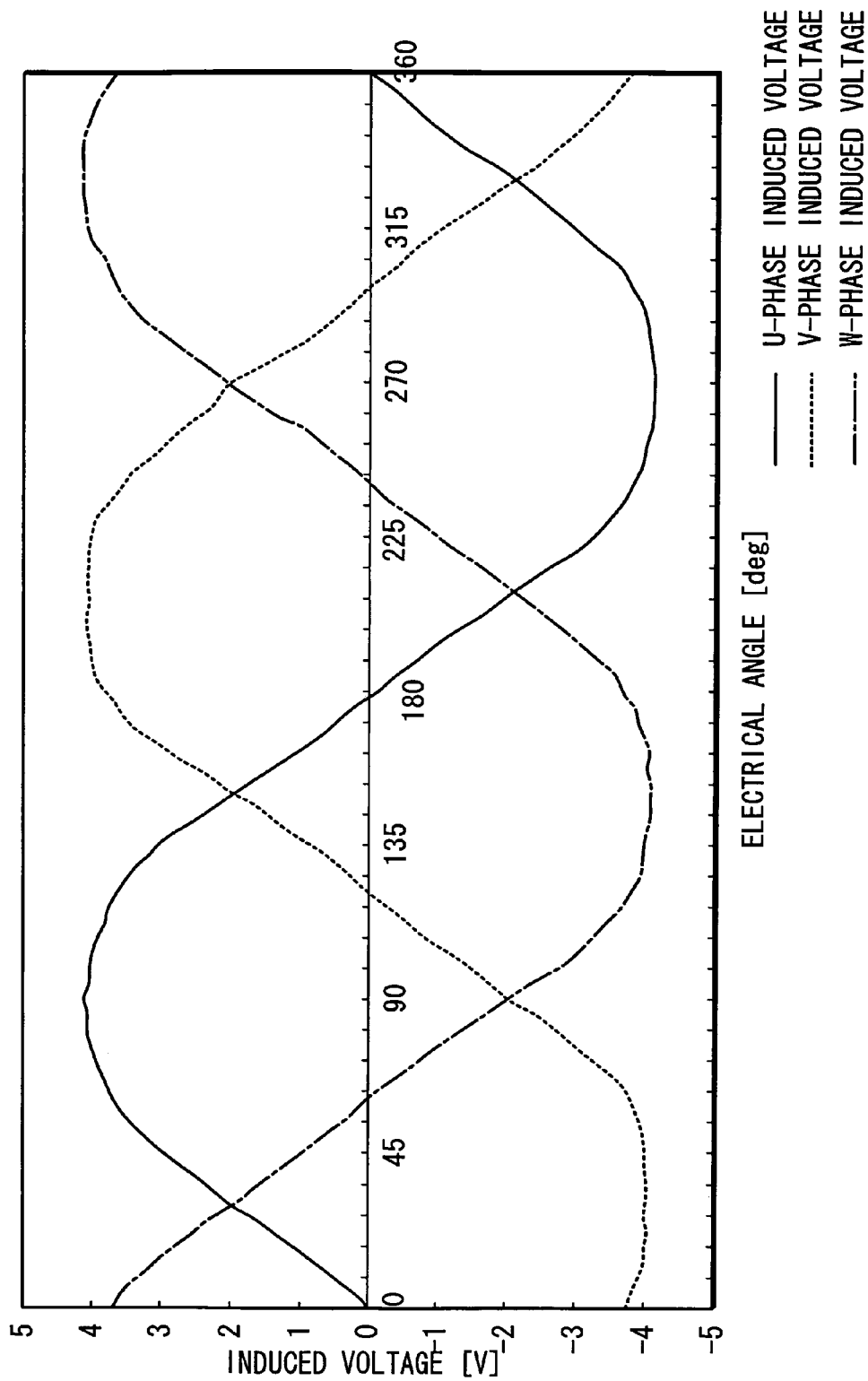
FIG. 7 is a waveform chart showing a specific example of experimental data on no-load induced electromotive force (induced voltage) of the above electric motor.
Figure 8:
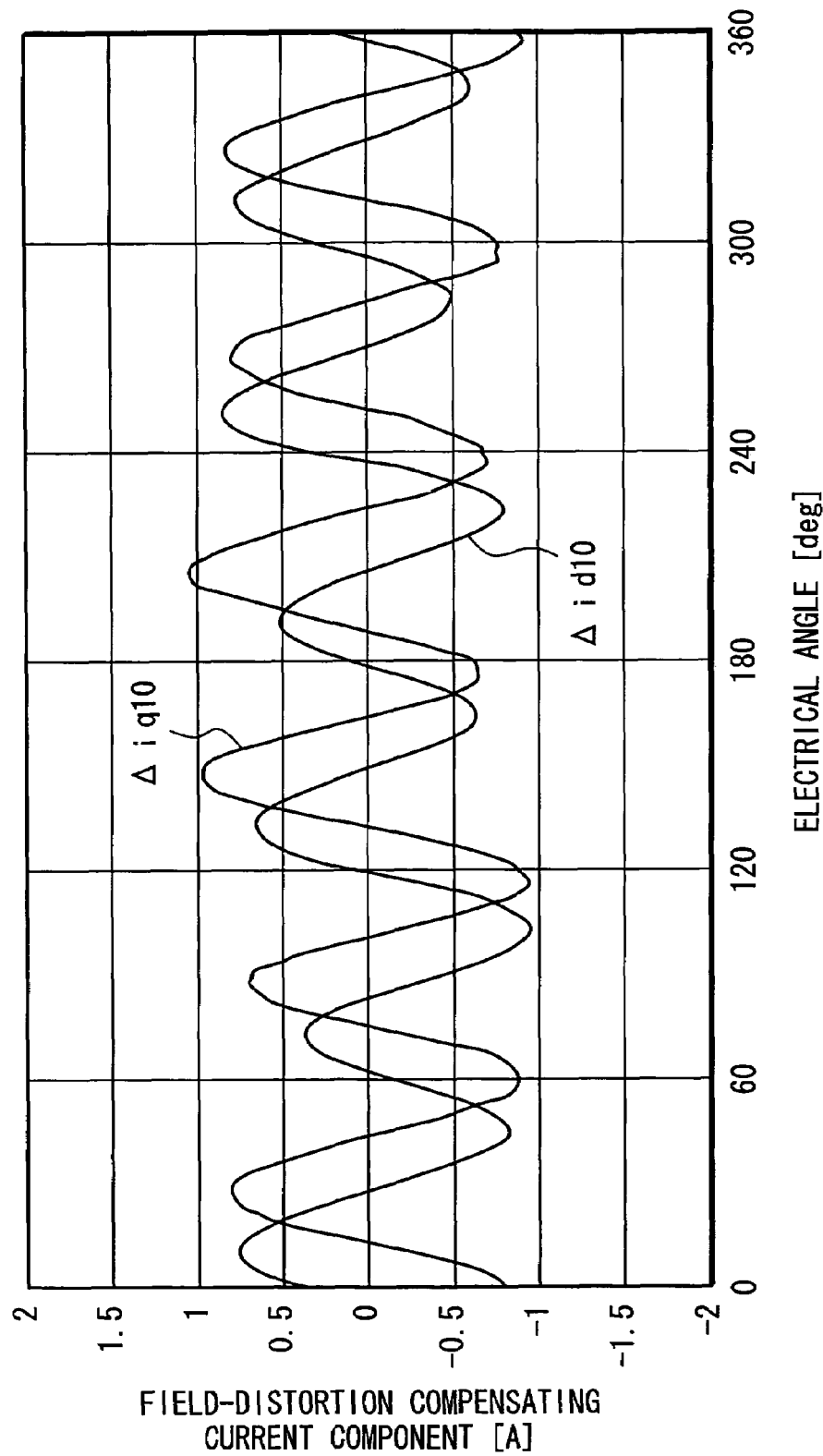
FIG. 8 is a waveform chart showing specific waveforms of field-distortion compensating components decided by a field-distortion compensation-value decision portion.

First, as shown in FIG. 7, experimental data on the no-load induced electromotive forces (induced voltages) at the respective phase field coils of the electric motor 5 are acquired by taking measurement on the instantaneous values e0u, e0v, e0w when the electrical angle of the motor 5 is varied. By using the experimental data and the above expressions (16) to (20), a d-axis current value i0d1 and a q-axis current value i0q1 are determined, which are required for permitting the motor 5 to output a unit torque (1 [Nm]) without inducing the torque ripple due to the distorted magnetic field formed therein. Furthermore, a d-axis current value i0d2 and a q-axis current value i0q2 are determined which are required for permitting the motor 5 to output the above unit torque in a case where the no-load induced electromotive force has an un-distorted waveform (in this case, the d-axis current value i0d2 and q-axis current value i0q2 are easily determined by applying the respective experimental data items to the predetermined calculations because the output torque is proportional to the q-axis current, and the d-axis current may be set to "0"). A difference between the d-axis current value i0d1 and the d-axis current value i0d2 is determined for each value of the electrical angle, thereby giving the aforesaid d-axis current unit compensation value Δid10 (=i0d1−i0d2). A difference between the q-axis current value i0q1 and the q-axis current value i0q2 is determined for each value of the electrical angle, thereby giving the aforesaid q-axis current unit compensation value Δiq10 (=i0q1−i0q2). Then, the electrical angle, the d-axis current unit compensation value Δid10 and the q-axis current unit compensation value Δiq10 may be correlated. As a result, as shown in FIG. 8, each current waveform representing a relation between the electrical angle and the value of the field-distortion compensating current component is obtained. The field-distortion compensating current component is a current component which is capable of suppressing the distortion of the magnetic field and which is converted to respective d-axis current and q-axis current corresponding to the electrical angle. A table correlating these data items may be prepared as the field distortion compensation map 39a.

The field-distortion compensation-value decision portion 39 refers to the field distortion compensation map 39a prepared as described above, thereby determining the d-axis current unit compensation value Δid10 and the q-axis current unit compensation value Δiq10 corresponding to the corrected electrical angle θmre supplied from the subtracter 38. Then, the decision portion 39 outputs the resultant values to the amplitude decision portion 40.

In addition to the d-axis current unit compensation value Δid10 and the q-axis current unit compensation value Δiq10 supplied from the field-distortion compensation-value decision portion 39, the q-axis fundamental-current command value i*q0 equivalent to the required steering assist force is supplied from the adder 17 (FIG. 3) to the amplitude decision portion 40. The amplitude decision portion 40 multiplies the respective d-axis current unit compensation value Δid10 and q-axis current unit compensation value Δiq10 per unit torque by the q-axis fundamental-current command value i*q0 so inputted, thereby determining a d-axis current compensation value Δid11 and a q-axis current compensation value Δiq11, each of which corresponds to the above required steering assist force. The amplitude decision portion 40 outputs the resultant d-axis current compensation value Δid11 and q-axis current compensation value Δiq11 to the respective multipliers 42, 43.

The aforesaid correction rate calculator 41 is supplied with the gain G of the current control system, which is decided by the gain/phase decision portion 37. The correction rate calculator 41 calculates an inverse 1/G of the gain G so as to obtain a correction rate Rm as a compensation value for the above gain G. Then, the correction rate calculator 41 outputs the correction rate Rm to the multipliers 42, 43.

The multiplier 42 multiplies the d-axis current compensation value Δid11 supplied from the amplitude decision portion 40 by the correction rate Rm supplied from the correction rate calculator 41, thereby determining the d-axis current compensation value Δid1 for field-distortion compensation. Then, the multiplier outputs the compensation value to the adder 21 (FIG. 3). Likewise, the multiplier 43 multiplies the q-axis current compensation value Δiq11 supplied from the amplitude decision portion 40 by the correction rate Rm supplied from the correction rate calculator 41, thereby determining the q-axis current compensation value Δiq1 for field-distortion compensation. Then, the multiplier outputs the compensation value to the adder 22 (FIG. 3). In this manner, the multipliers 42, 43 correct the d-axis current compensation value Δid11 and the q-axis current compensation value Δiq11 with the correction rate Rm, thereby compensating for the gain decrease dependant upon the frequency characteristic of the current control system.

[Constitution and Operations of High-Order Current Distortion Compensator]

Figure 5:
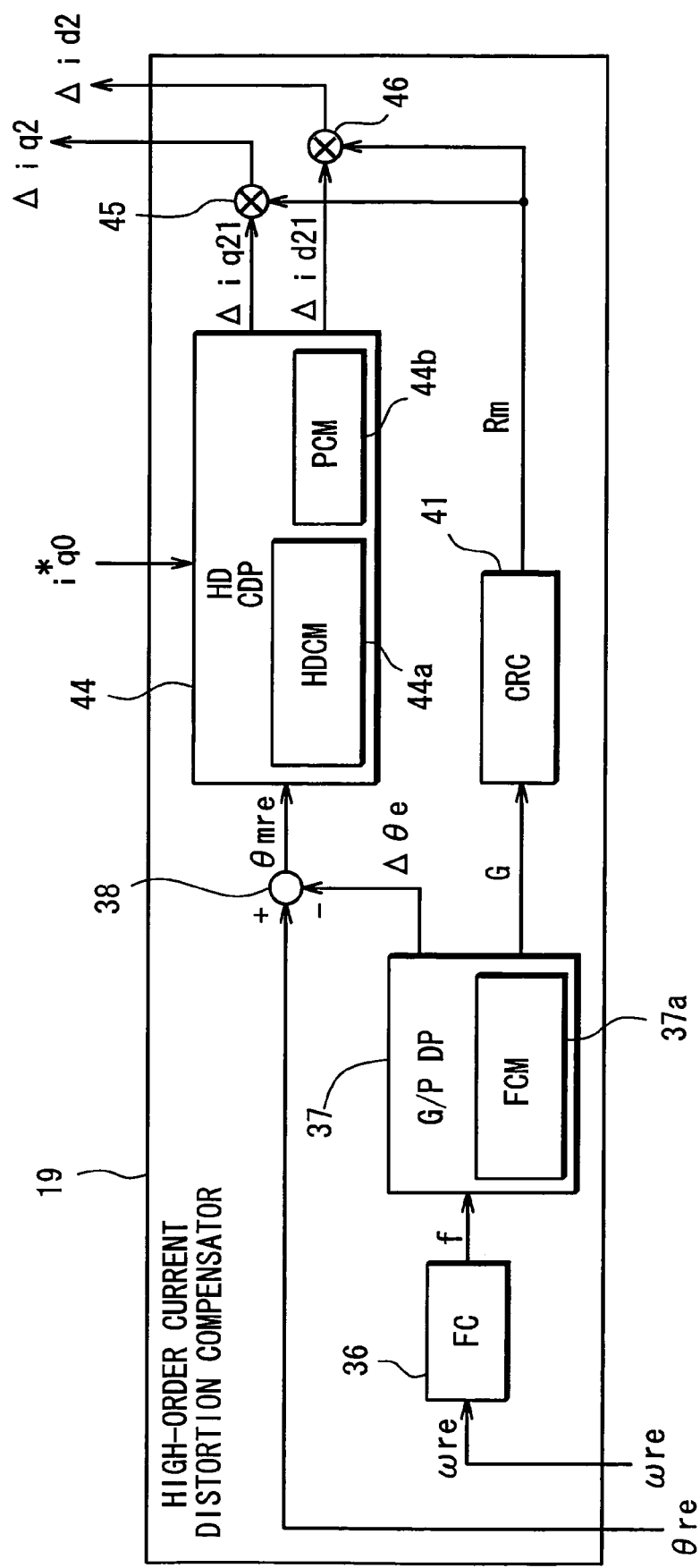
FIG. 5 is a block diagram showing a specific example of a constitution of a high-order current distortion compensator shown in FIG. 3.

FIG. 5 is a block diagram showing a specific example of a constitution of the high-order current distortion compensator shown in FIG. 3. As shown in the figure, the high-order current distortion compensator 19 is provided with function blocks including the frequency calculator 36, the gain/phase decision portion 37, the subtracter 38, the correction rate calculator 41, a high-order-current distortion compensation-value decision portion 44 and multipliers 45, 46. The microcomputer 100 executes programs thereby causing the individual blocks to perform predetermined calculation processes. Out of these function blocks, the frequency calculator 36, the gain/phase decision portion 37, the subtracter 38 and the correction rate calculator 41 are constituted to perform the same calculation processes as those of the magnetic-field distortion compensator 18. That is, these function blocks are adapted to calculate a phase compensation value $\Delta\theta e$ and a gain compensation value Rm for compensating for the phase delay and gain decrease dependant upon the frequency characteristic of the current control system.

The high-order-current distortion compensation-value decision portion 44 stores a high-order-current distortion compensation map 44a and a phase correction map 44b. The high-order-current distortion map tabulates a relation between the q-axis fundamental-current command value $i*q0$ and the gain of each of predetermined high-order components such as the fifth-order, seventh-order, eleventh-order and thirteenth-order components relative to the first-order component. The phase correction map 44b tabulates a relation between each of the above high-order components and the correction value for compensating for its phase delay relative to the first-order component. When supplied with the corrected electrical angle $\theta mre$ from the subtracter 38 and with the q-axis fundamental-current command value $i*q0$ from the adder 17 (FIG. 3), the high-order-current distortion compensation-value decision portion 44 refers to the high-order-current distortion compensation map 44a and the phase correction map 44b, thereby determining a d-axis-current base compensation value $\Delta id21$ and a q-axis-current base compensation value $\Delta iq21$ for high-order current compensation.

A detailed description will be made on a method of preparing the high-order-current distortion compensation map 44a and the phase correction map 44b, as below.

Figure 9:
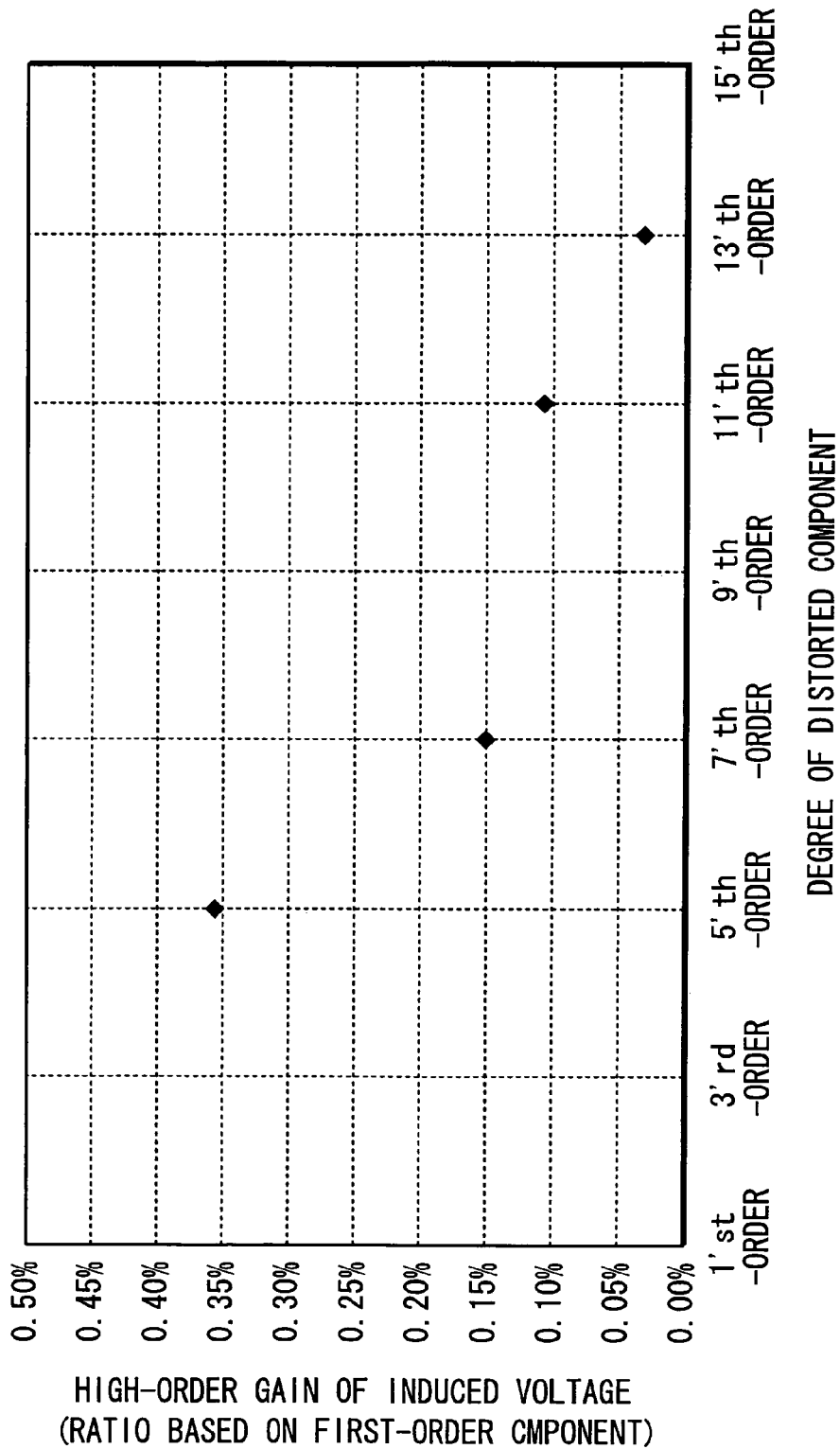
FIG. 9 is a graph showing an example of measurements of ratios of high-order components, contained in an induced voltage of the electric motor, based on a first-order component of the voltage.

In the electric motor 5, the motor driver circuit 32 (FIG. 3) chops the direct current from the battery (FIG. 1) so as to supply the sinusoidal current to the individual phase field coils. Furthermore, the motor driver circuit 32 drives the switching devices constituting the bridge circuit therein with a minor dead time interposed between On and OFF operations of the devices in order to prevent the switching devices from shorting with one another. Because of these factors, the currents flowing through the individual phase field coils contain higher harmonic content, such as the fifth-order, the seventh-order, the eleventh-order and the thirteenth-order harmonics, superimposed on the sinusoidal current component (fundamental harmonic). Because of the above factors, the induced voltage in the motor 5 contains the predetermined high-order components, as shown in FIG. 9 for example, so that the same high-order components produced by the rotation of the distorted magnetic field are also added to the currents flowing through the phase field coils, which currents have distorted waveforms relative to the fundamental waveform (idealistic waveform). Therefore, the following procedure may be taken. Experimental data on the currents flowing through the respective phase field coils are previously acquired, while measurement is taken on the respective values of the high-order components superimposed on the currents of the acquired values. Based on the measurement values of each of the high-order components, the adders 21, 22 perform addition processes for determining respective compensation values for each of the high-order components. The compensation values are so determined as to cancel the current of each of the high-order components and are converted in terms of the d-q coordinates. That is, the aforesaid d-axis-current base compensation value $\Delta id21$ and q-axis-current base compensation value $\Delta iq21$ may be divided into respective compensation values $\Delta id2$-5, $\Delta iq2$-5 for canceling the fifth-order component, respective compensation values $\Delta id2$-7, $\Delta iq2$-7 for canceling the seventh-order component, respective compensation values $\Delta id2$-11, $\Delta iq2$-11 for canceling the eleventh-order component, and respective compensation values $\Delta id2$-13, $\Delta iq2$-13 for canceling the thirteenth-order component, as indicated by the following expressions (21) and (22).

$$\Delta id21 = \Delta id2\text{-}5 + \Delta id2\text{-}7 + \Delta id2\text{-}11 + \Delta id2\text{-}13 \qquad (21)$$

$$\Delta iq21 = \Delta iq2\text{-}5 + \Delta iq2\text{-}7 + \Delta iq2\text{-}11 + \Delta iq2\text{-}13 \qquad (22)$$

The respective superimposition ratios of the predetermined high-order components vary according to the motor load (output torque) as the required steering assist force, namely, the q-axis fundamental-current command value $i*q0$. The respective current phases of the high-order components also delay relative to that of the first-order component according the q-axis fundamental-current command value $i*q0$. In the output torque from the electric motor 5, the fifth-order and seventh-order components appear as the sixth-order component. Hence, the compensation values for the fifth-order current $\Delta id2$-5, $\Delta iq2$-5 and the compensation values for the seventh-order current $\Delta id2$-7, $\Delta iq2$-7 are represented by the following expressions (23) to (26), respectively:

$$\Delta id2\text{-}5 = i5(i*q0) \times \sin[6\{\theta re + \theta 5(i*q0)\}] \qquad (23)$$

$$\Delta iq2\text{-}5 = i5(i*q0) \times \cos[6\{\theta re + \theta 5(i*q0)\}] \qquad (24)$$

$$\Delta id2\text{-}7 = i7(i*q0) \times \sin[6\{\theta re + \theta 7(i*q0)\}] \qquad (25)$$

$$\Delta iq2\text{-}7 = -i7(i*q0) \times \cos[6\{\theta re + \theta 7(i*q0)\}] \qquad (26)$$

In the output torque from the electric motor 5, the eleventh-order and thirteenth-order components appear as the twelfth-order component. Hence, the compensation values for the eleventh-order current $\Delta id2$-11, $\Delta iq2$-11 and the compensation values for the thirteenth-order current $\Delta id2$-13, $\Delta iq2$-13 are represented by the following expressions (27) to (30), respectively:

$$\Delta id2\text{-}11 = i11(i*q0) \times \sin[12\{\theta re + \theta 11(i*q0)\}] \qquad (27)$$

$$\Delta iq2\text{-}11 = i11(i*q0) \times \cos[12\{\theta re + \theta 11(i*q0)\}] \qquad (28)$$

$$\Delta id2\text{-}13 = i13(i*q0) \times \sin[12\{\theta re + \theta 13(i*q0)\}] \qquad (29)$$

$$\Delta iq2\text{-}13 = -i13(i*q0) \times \cos[12\{\theta re + \theta 13(i*q0)\}] \qquad (30)$$

By using the above expressions (23) to (30), the respective compensation values for the fifth-order, seventh-order, eleventh-order and thirteenth-order components can be calculated with respect to each d-axis current and each q-axis current. Hence, the high-order-current distortion compensation map 44a and the phase correction map 44b may be prepared as follows.

Figure 10:
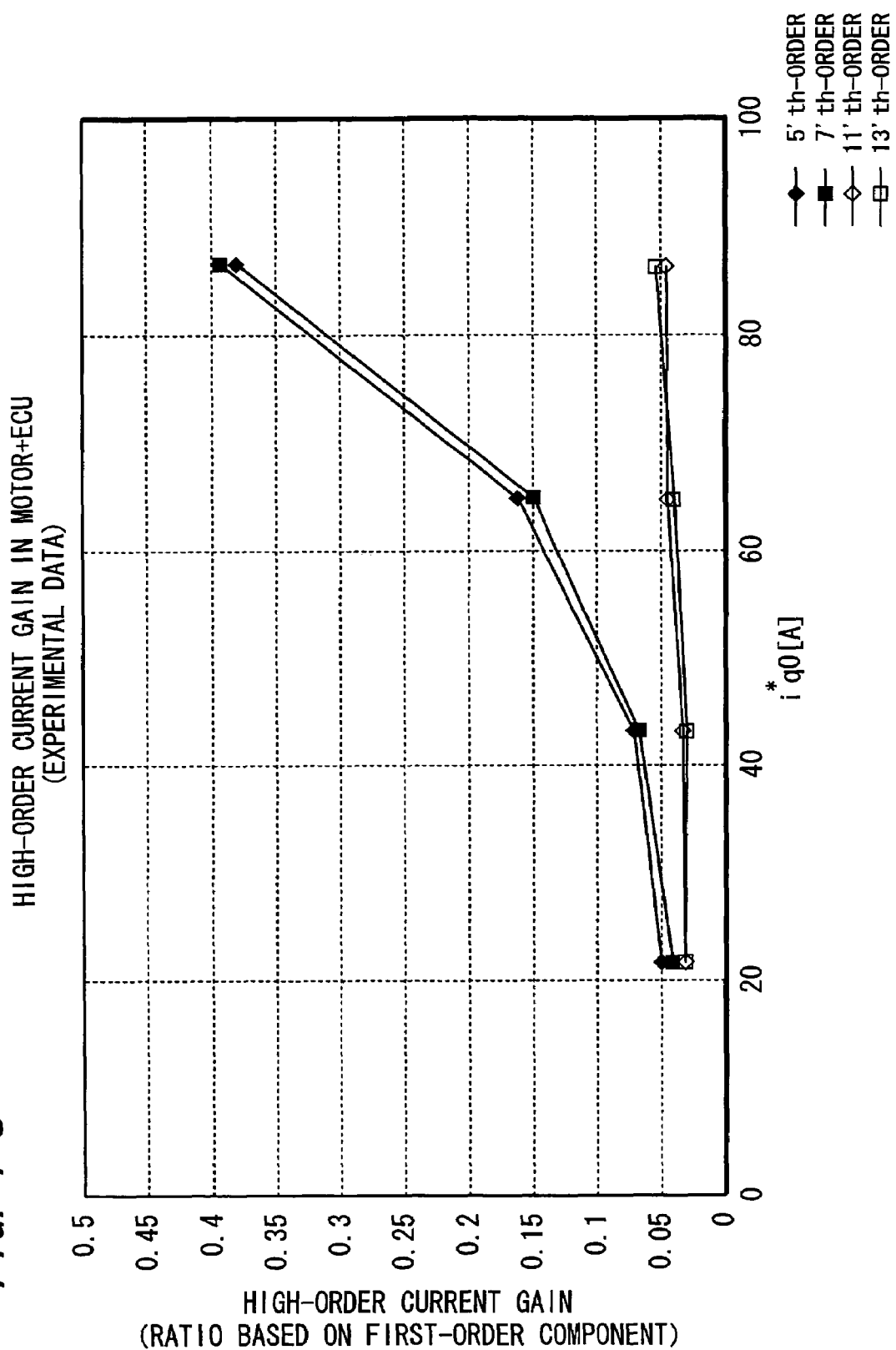
FIG. 10 is a graph showing an example of measurements of varied gains of the high-order components, contained in the target current for the electric motor, based on the first-order component.

First, experimental data are acquired with respect to a gain of each of the high-order components relative to the first-order component (fundamental wave) when the supply current is varied to vary the output torque of the electric motor 5. Thus is obtained a graph, as shown in FIG. 10 for example, which shows a relation between the q-axis fundamental-current command value $i*q0$ and the high-order current gain with respect to each of the high-order components. In the figure, each set of four plots indicate the output torques from the electric motor 5 as provided at each of the high-order components. Starting from the left side as seen in the figure, the respective plots represent the gains at the torques of 1.0, 2.0, 3.0 and 4.0 {Nm}. Based on the graph so prepared, a table correlating, for example, the value of i5(i*q0) in the above expressions (23) and (24) and the value of the q-axis fundamental-current command value i*q0 may be formed as the high-order current distortion compensation map 44a.

Furthermore, based on the measured waveform of the motor supply current when the output torque (motor load) is varied as described above, experimental data are acquired with respect to the phase delay of each of the high-order components relative to the fundamental wave contained in the current waveform. Based on the acquired data, a correction value for canceling the phase delay may be determined. As a correction value for the fifth-order component, for example, the value of θ5(i*q0) in the above expressions (23) and (24) may be determined. A table correlating the correction value so determined and the q-axis fundamental-current command value i*q0 may be formed as the phase correction map 44b.

When supplied with the corrected electrical angle θmre from the subtracter 38 which corrects the electrical angle with the phase compensation value Δθe from the gain/phase decision portion 37, and the q-axis fundamental-current command value i*q0 from the adder 17 (FIG. 3), the high-order-current distortion compensation-value decision portion 44 refers to the high-order-current distortion compensation map 44a and the phase correction map 44b prepared as described above, thereby deciding the d-axis-current base compensation value Δid21 and the q-axis-current base compensation value Δiq21 corresponding to the corrected electrical angle θmre and the q-axis fundamental-current command value i*q0 so inputted. Then, the high-order-current distortion compensation-value decision portion 44 outputs the d-axis-current base compensation value Δid21 and the q-axis-current base compensation value Δiq21 to the respective multipliers 45 and 46, which multiply the respective input values by the gain compensation value Rm from the correction rate calculator 41. The resultant products, as the d-axis current compensation value Δid2 and the q-axis current compensation value Δiq2 for high-order current compensation, are outputted to the respectively corresponding adders 21, 22.

According to the embodiment of the aforementioned constitution, the high-order current distortion compensator 19 (torque-ripple compensation decision means) uses the corrected electrical angle θmre (rotational position information) and the q-axis fundamental-current command value i*q0 (target current value) for estimating torque ripple produced by the fifth-order, seventh-order, eleventh-order and thirteenth-order components of the current through the electric motor 5, the individual phase filed coils of which are supplied with the current of a value specified by the q-axis fundamental-current command value i*q0. Based on the estimation, the compensator 19 decides the d-axis current compensation value Δid2 and the q-axis current compensation value Δiq2 for high-order current compensation which are used for varying the q-axis fundamental-current command value i*q0 in a manner to cancel the estimated torque ripple. On the other hand, the magnetic-field distortion compensator 18 (torque-ripple compensation decision means) uses the corrected electrical angle θmre and the q-axis fundamental-current command value i*q0 for estimating torque ripple caused by the distorted magnetic field in the electric motor 5, the individual phase field coils of which are supplied with the current of a value specified by the q-axis fundamental-current command value i*q0. Based on the estimation, the compensator 18 decides the d-axis current compensation value Δid1 and the q-axis current compensation value Δiq1 for field-distortion compensation which are used for varying the q-axis fundamental-current command value i*q0 in a manner to cancel the estimated torque ripple. As indicated by the above expressions (8) and (9), the adders 21 and 22 (correction means) use the resultant d-axis current compensation value Δid1 and d-axis current compensation value Δid2, and the resultant q-axis current compensation value Δiq1 and q-axis current compensation value Δiq2 so as to vary the corresponding command values of the d-axis current and q-axis current. Based on the command values so changed, the feedback controller 200 (feedback control means) drives the electric motor 5. As a result, the torque ripple caused by the high-order components and the torque ripple caused by the distorted magnetic field are suppressed when the current based on the above target current value flows through the electric motor 5. Therefore, the steering feeling is prevented from being degraded due to these ripples.

According to the embodiment, the magnetic-field distortion compensator 18 and the high-order current distortion compensator 19 are each provided with the gain compensation calculation means constituted by the frequency calculator 36, the gain/phase decision portion 37 and the correction rate calculator 41. The respective output values from the magnetic-field distortion compensator 18 and the high-order current distortion compensator 19 are corrected with the gain compensation value (correction rate Rm) calculated by the calculation means. This provides for the compensation for the gain decrease of the current through the motor according to the frequency characteristic of the current control system, the current gain decreasing as the rotational speed of the motor is increased. Therefore, the steering feeling is prevented from being degraded in conjunction with the decrease of the gain.

According to the embodiment, the magnetic-field distortion compensator 18 and the high-order current distortion compensator 19 are each provided with the phase compensation calculation means constituted by the frequency calculator 36 and the gain/phase decision portion 37. The detected electrical angle θre is corrected with the phase compensation value (phase difference Δθe) calculated by the calculation means. Thus, the phase delay dependant upon the frequency characteristic of the current control system is compensated. This compensates for the phase delay of the supply current through the motor 5 relative to the induced voltage even when the rotational speed of the electric motor 5 is varied, the phase delay dependant upon the frequency characteristic of the current control system. Therefore, the steering feeling is prevented from being degraded in conjunction with the phase delay.

Figure 11:
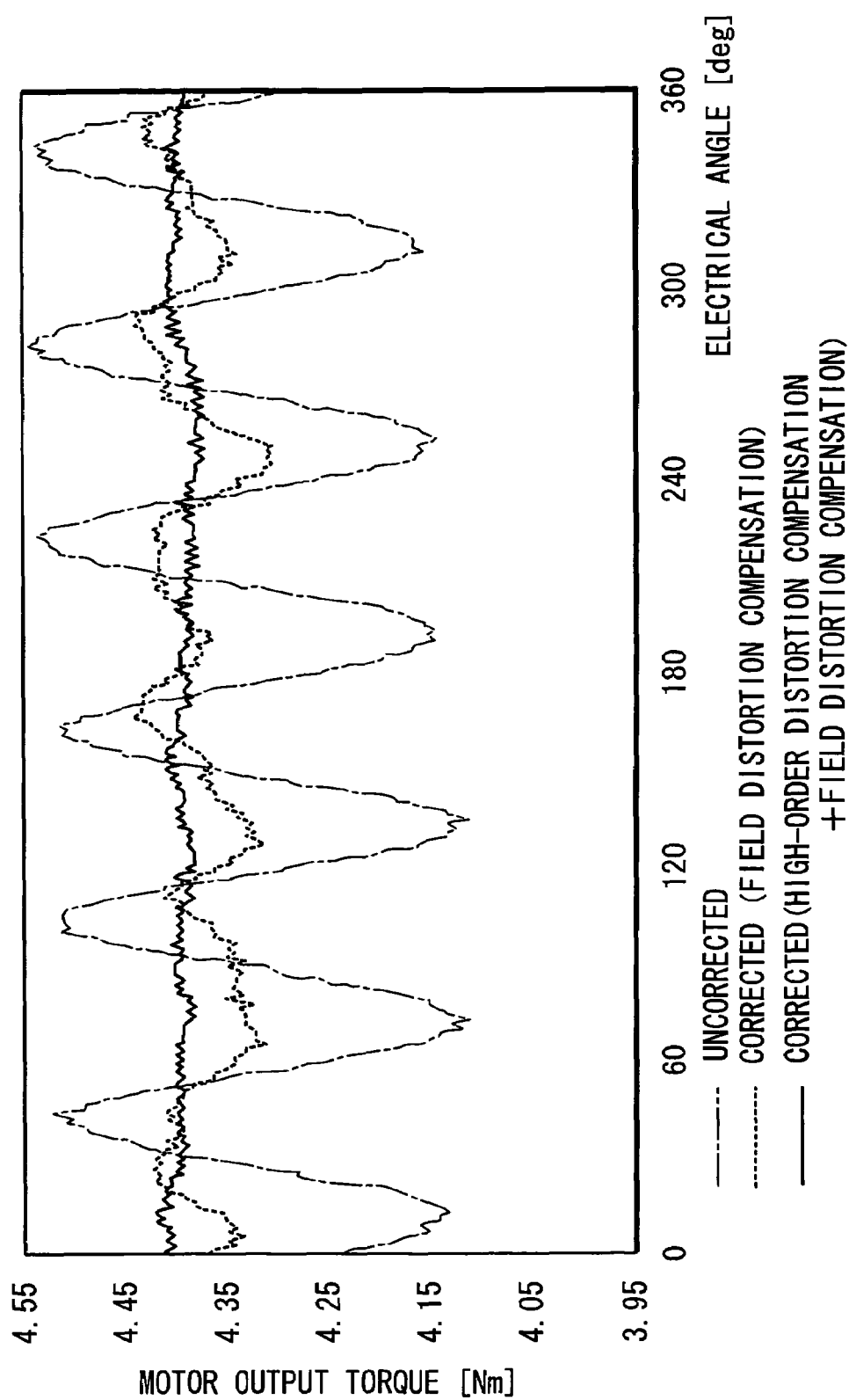
FIG. 11 is a waveform chart showing specific output torques from the electric motor.

Now referring to FIG. 11 showing specific output torques from the electric motor, a detailed description is made on the working effect of the torque-ripple compensation decision portion.

In a case where the feedback controller 200 drives the electric motor 5 using the d-axis fundamental-current command value i*d0 and the q-axis fundamental-current command value i*q0 represented by the respective first terms of the above expressions (8) and (9) instead of using the respective output values from the magnetic-field distortion compensator 18 and the high-order current distortion compensator 19, the motor output torque significantly fluctuates due to the appearance of a great torque ripple, as indicated by a dot-dash line in FIG. 11.

In a case where the feedback controller 200 drives the electric motor 5 using the output value from the magnetic-field distortion compensator 18, namely, the target value specified by the respective sum of the first and second terms of the respective expressions (8) and (9), the motor output torque is removed of the ripple resulting from the distorted magnetic field and hence, the torque has a detection waveform indicated by a dot line in the figure.

In a case where the feedback controller 200 drives the electric motor 5 using the respective output values from the magnetic-field distortion compensator 18 and the high-order current distortion compensator 19, namely, the target value specified by the respective sum of the first to third terms of the respective expressions (8) and (9), the motor output torque is removed of not only the ripple resulting from the distorted magnetic field but also the ripple caused by the fifth-order, seventh-order, eleventh-order and thirteenth-order components. Specifically, the sixth-order ripple determined by the above expressions (23) to (26) and the twelfth-order ripple determined by the above expressions (27) to (30) are removed from the motor output torque, so that the torque has a stable detection waveform with less fluctuation, as indicated by a solid line in the figure. That is, the embodiment is adapted for substantial reduction of the quantity of torque ripple in a system wherein with the increase of the q-axis fundamental-current command value i*q0 (the motor load for producing the required steering assist force), the high-order components are more prone to be superimposed on the current through the electric motor 5, as shown in FIG. 10, so that the quantity of torque ripple produced by the superimposed high-order components is increased to degrade the steering feeling. As a result, the system may perform the assist operation in a stable manner during a steering operation requiring steering assist based on a comparatively great assist force, such as steering without driving for changing the tire angle of the dirigible wheels of the vehicle at standstill.

While the foregoing description illustrates the case where the invention is applied to the column-assist electric power steering system wherein the electric motor 5 is connected to the steering shaft 2 via the reduction mechanism 4, the invention may be applied to any system provided with the torque-ripple compensation decision means for deciding the compensation value for current high-order-component for canceling the torque ripple caused by the predetermined high-order components As a specific example, the invention may also be applied to systems of other assist types, such as a rack-assist type wherein the electric motor 5 is connected to a rack shaft of the rack-and-pinion transmission mechanism 6 so as to assist the movement of the rack shaft.

While the foregoing description illustrates the constitution to decide the compensation value for canceling the torque ripple caused by the predetermined high-order components including the fifth-order, the seventh-order, the eleventh-order and thirteenth-order components, the invention is not limited to this. An alternative compensation value may be decided such as to compensate for (cancel) higher harmonic components prone to be superimposed on the fundamental wave (the first-order component), such as the fifth-order and the seventh-order components as shown in FIG. 10.

While the foregoing description illustrates the case where the magnetic-field distortion compensator 18 and the high-order current distortion compensator 19 of the torque-ripple compensation decision portion 101 are individually provided with the gain compensation calculation means and the phase compensation calculation means, some of the function blocks of which are shared by these compensators, the invention is not limited to this. Instead of providing the above calculation means in the respective compensators 18, 19 of the torque-ripple compensation decision portion 101, the above calculation means may be interposed between the compensation decision portion 101 and the feedback controller 200, for example. The compensators 18, 19 decide the respective compensation values for the magnetic-field distortion and for the high-order current distortion by using the electrical angle θre from the rotor angular-position sensor 35 and the q-axis fundamental-current command value i*q0 from the adder 22. Subsequently, these values so decided may be corrected with the gain compensation value determined by the gain compensation calculation means and the phase compensation value determined by the phase compensation calculation means, respectively. The corrected values may be inputted, as the command values, to the feedback controller 200.

While the foregoing description illustrates the constitution, for example, wherein the high-order-current distortion compensation map 44a is stored in the high-order-current distortion compensation-value decision portion 44, an alternative constitution may be made such that the mathematical expressions (21) to (30) are stored in the microcomputer 100 wherein the decision portion 44 computes based on these mathematical expressions thereby deciding the compensation values.

While the foregoing description illustrates the case where the three-phase brushless motor is used as the electric motor 5, the electric motor of the invention is not limited to this. The invention is also applicable to systems employing the other types of motors such as brushless motors having different numbers of phases than three, and DC motors with brushes.

The invention claimed is:

1. An electric power steering system operative to decide a target current value of an electric motor according to an operation of a steering member and to provide steering assist by applying a power of the motor to a steering mechanism, comprising:
   torque-ripple compensation decision means which uses rotational position information on the electric motor and the decided target current value to thereby decide a compensation value for current high-order-component for canceling torque ripple caused by predetermined high-order components of the current flowing through the motor;
   correction means for correcting the decided target current value by using the compensation value supplied from the torque-ripple compensation decision means; and
   feedback control means for providing feedback control of the electric motor based on the target current value corrected by the correction means.

2. An electric power steering system according to claim 1, wherein the torque-ripple compensation decision means varies the compensation value for current high-order-component according to the decided target current value.

3. An electric power steering system according to claim 1 or 2, wherein the torque-ripple compensation decision means is provided not only with a high-order current distortion compensator for deciding the compensation value for current high-order-component, but also with
   a magnetic-field distortion compensator which uses the rotational position information on the electric motor and the decided target current value, for deciding a field-distortion compensation value for suppressing torque ripple caused by a distorted magnetic field formed in the motor.

4. An electric power steering system according to claim 1 or 2, further comprising:
   a current control system including the electric motor and the feedback control means;
   rotational-speed detection means for detecting a rotational speed of the electric motor based on the rotational position information; and
   gain compensation calculation means for determining a gain compensation value for compensating for gain decrease dependant upon a frequency characteristic of the current control system, the compensation value determined based on the rotational speed of the electric motor supplied from the rotational-speed detection means, wherein the correction means corrects the decided target current value by using the compensation value supplied from the torque-ripple compensation decision means and the gain compensation value supplied from the gain compensation calculation means.

5. An electric power steering system according to claim 4, further comprising phase compensation calculation means for determining a phase compensation value for compensating for phase delay dependant upon the frequency characteristic of the current control system, the phase compensation value determined based on the rotational speed of the electric motor supplied from the rotational-speed detection means, wherein the correction means corrects the decided target current value by using the compensation value supplied from the torque-ripple compensation decision means, the gain compensation value supplied from the gain compensation calculation means and the phase compensation value supplied from the phase compensation calculation means.

* * * * *